US012783223B2

(12) United States Patent
Alves et al.

(10) Patent No.: US 12,783,223 B2
(45) Date of Patent: Nov. 3, 2026

(54) HETEROGENEOUS AUTOMATION SCRIPT MANAGEMENT WITH DYNAMIC ENVIRONMENT PREPARATION

(71) Applicant: International Business Machines Corporation, Armonk, NY (US)

(72) Inventors: Vinicius Maidana Alves, Sao Paulo (BR); Angelo Fernando Siqueira Alves, Sao Paulo (BR); Gabriel Duarte Sanchez, Sao Paulo (BR); Lucas Lima Oliveira, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 18/366,330

(22) Filed: Aug. 7, 2023

(65) Prior Publication Data

US 2025/0053400 A1 Feb. 13, 2025

(51) Int. Cl.

| | |
|---|---|
| ***G06F 8/61*** | (2018.01) |
| ***G06F 8/41*** | (2018.01) |
| ***G06F 9/50*** | (2006.01) |
| ***G06F 9/54*** | (2006.01) |

(52) U.S. Cl.
CPC ................ *G06F 8/61* (2013.01); *G06F 8/433* (2013.01); *G06F 9/5055* (2013.01); *G06F 9/541* (2013.01)

(58) Field of Classification Search
CPC .......... G06F 8/61; G06F 8/433; G06F 9/5055; G06F 9/541
USPC .......................................................... 717/174
See application file for complete search history.

(56) References Cited

U.S. PATENT DOCUMENTS

| | | | |
|---|---|---|---|
| 11,354,101 B2 | 6/2022 | Collins et al. | |
| 12,026,144 B1 * | 7/2024 | Kozoshnik | G06Q 10/087 |
| 2004/0177352 A1 | 9/2004 | Narayanaswamy et al. | |
| 2007/0226259 A1 | 9/2007 | Kacin et al. | |

(Continued)

FOREIGN PATENT DOCUMENTS

| | | |
|---|---|---|
| CN | 113076109 A | 7/2021 |
| WO | 2025/031679 A1 | 2/2025 |

OTHER PUBLICATIONS

International Searching Authority, "Notification of Transmittal of the International Search Report and the Written Opinion of the International Searching Authority, or Declaration," Patent Cooperation Treaty, Sep. 20,. 2024, 13 pages, International Application No. PCT/EP2024/068678.

(Continued)

*Primary Examiner* — Bradford F Wheaton
(74) *Attorney, Agent, or Firm* — Seed Intellectual Property Law Group LLP

(57) ABSTRACT

Embodiments of the present invention disclose an approach for managing a plurality of heterogeneous automation scripts with dynamic environment preparation. Specifically, the approach involves allowing users to upload a script to a centralized script manager. The uploaded script is then analyzed to determine the necessary runtime environment and library resources required for successful execution. After resolving the dependencies of the script, an optimal machine on a centralized server is selected for automation. The chosen machine is equipped with the required runtime environment and library resources, which are automatically installed.

20 Claims, 4 Drawing Sheets

(56) References Cited

U.S. PATENT DOCUMENTS

| | | | | |
|---|---|---|---|---|
| 2015/0033237 | A1* | 1/2015 | Piazza | G06F 9/46 718/102 |
| 2018/0357045 | A1* | 12/2018 | Hollands | G06F 8/10 |
| 2019/0155225 | A1 | 5/2019 | Kothandaraman et al. | |
| 2021/0014114 | A1 | 1/2021 | Doshi et al. | |
| 2021/0117313 | A1 | 4/2021 | Geary | |
| 2022/0091826 | A1 | 3/2022 | Collins et al. | |
| 2022/0156053 | A1* | 5/2022 | Shaastry | G06F 8/71 |
| 2022/0291922 | A1 | 9/2022 | Chapman et al. | |
| 2022/0394051 | A1* | 12/2022 | Simon | H04L 63/145 |
| 2022/0405092 | A1 | 12/2022 | Miedema et al. | |
| 2024/0037077 | A1* | 2/2024 | Verma | G06F 16/254 |

OTHER PUBLICATIONS

"IBM Cloud Pak for Business Automation", https://www.ibm.com/products/cloud-pak-for-business-automation, Printed Jun. 13, 2023, 15 pages.
"Achieve zero-touch network operations", https://www.ibm.com/products/cloud-pak-for-network-automation, Printed Jun. 13, 2023, 7 pages.
"Infuse your AIOps platform with intelligent IT operations", https://www.ibm.com/products/cloud-pak-for-watson-aiops, Printed Jun. 13, 2023, 7 pages.
"Red Hat OpenShift on IBM Cloud", https://www.ibm.com/br-pt/cloud/openshift, Printed Jun. 13, 2023, 15 pages.
European Patent Office, "EP Examination Report", Aug. 24, 2026, 09 pages, EP Application No. 24738309.

* cited by examiner

HETEROGENEOUS AUTOMATION SCRIPT MANAGEMENT WITH DYNAMIC ENVIRONMENT PREPARATION

TECHNICAL FIELD

The present invention relates to managing script execution and more specifically to embodiments for managing a plurality of heterogeneous automation scripts with dynamic environment preparation.

BACKGROUND

In some companies, it can be common to have a multitude of scripts written in various programming languages like Python, Node, and C#. These scripts can serve different functions and operate in separate environments. However, managing the execution of these scripts across different environments can be a daunting task. The challenge can lie in the fact that these scripts make use of different technologies, each with its own unique requirements. For example, some scripts may require specific runtimes or software development kits (SDKs), while others may rely on specific database connections or scheduling software.

Due to these diverse technology requirements, automating and orchestrating the execution of scripts can become complex. Each script may need its own environment setup, including the installation of necessary runtimes, SDKs, or other dependencies. Additionally, coordinating the scheduling and monitoring of these scripts across different environments can be time-consuming and/or error prone.

SUMMARY

Embodiments of the present invention disclose an approach for managing a plurality of heterogeneous automation scripts with dynamic environment preparation. Specifically, the approach involves allowing users to upload a script to a centralized script manager. The uploaded script is then analyzed to determine the necessary runtime environment and library resources required for successful execution. After resolving the dependencies of the script, an optimal machine on a centralized server is selected for automation. The chosen machine is equipped with the required runtime environment and library resources, which are automatically installed.

A first aspect of the present invention provides a method for managing heterogeneous automation scripts, comprising: analyzing, by a script orchestrator engine, a script uploaded to a centralized script manager by a user to identify a runtime environment for the script and a set of library resources required for successful script execution; resolving, by the script orchestrator engine, a set of dependencies for the script based on the analyzing; selecting, by the script orchestrator engine, an optimal machine on a centralized server for automation of the script based on the runtime environment and dependencies; and automatically installing the runtime environment and library resources for the script on the optimal machine.

A second aspect of the present invention provides a computing system for managing heterogeneous automation scripts, comprising: a processor; a memory device coupled to the processor; and a computer readable storage device coupled to the processor, wherein the storage device contains program code executable by the processor via the memory device to implement a method, the method comprising: analyzing, by a script orchestrator engine, a script uploaded to a centralized script manager by a user to identify a runtime environment for the script and a set of library resources required for successful script execution; resolving, by the script orchestrator engine, a set of dependencies for the script based on the analyzing; selecting, by the script orchestrator engine, an optimal machine on a centralized server for automation of the script based on the runtime environment and dependencies; and automatically installing the runtime environment and library resources for the script on the optimal machine.

A third aspect of the present invention provides a computer program product for managing heterogeneous automation scripts, the computer program product comprising a computer readable storage device, and program instructions stored on the computer readable storage device, to: analyze, by a script orchestrator engine, a script uploaded to a centralized script manager by a user to identify a runtime environment for the script and a set of library resources required for successful script execution; resolve, by the script orchestrator engine, a set of dependencies for the script based on the analyzing; select, by the script orchestrator engine, an optimal machine on a centralized server for automation of the script based on the runtime environment and dependencies; and automatically install the runtime environment and library resources for the script on the optimal machine.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
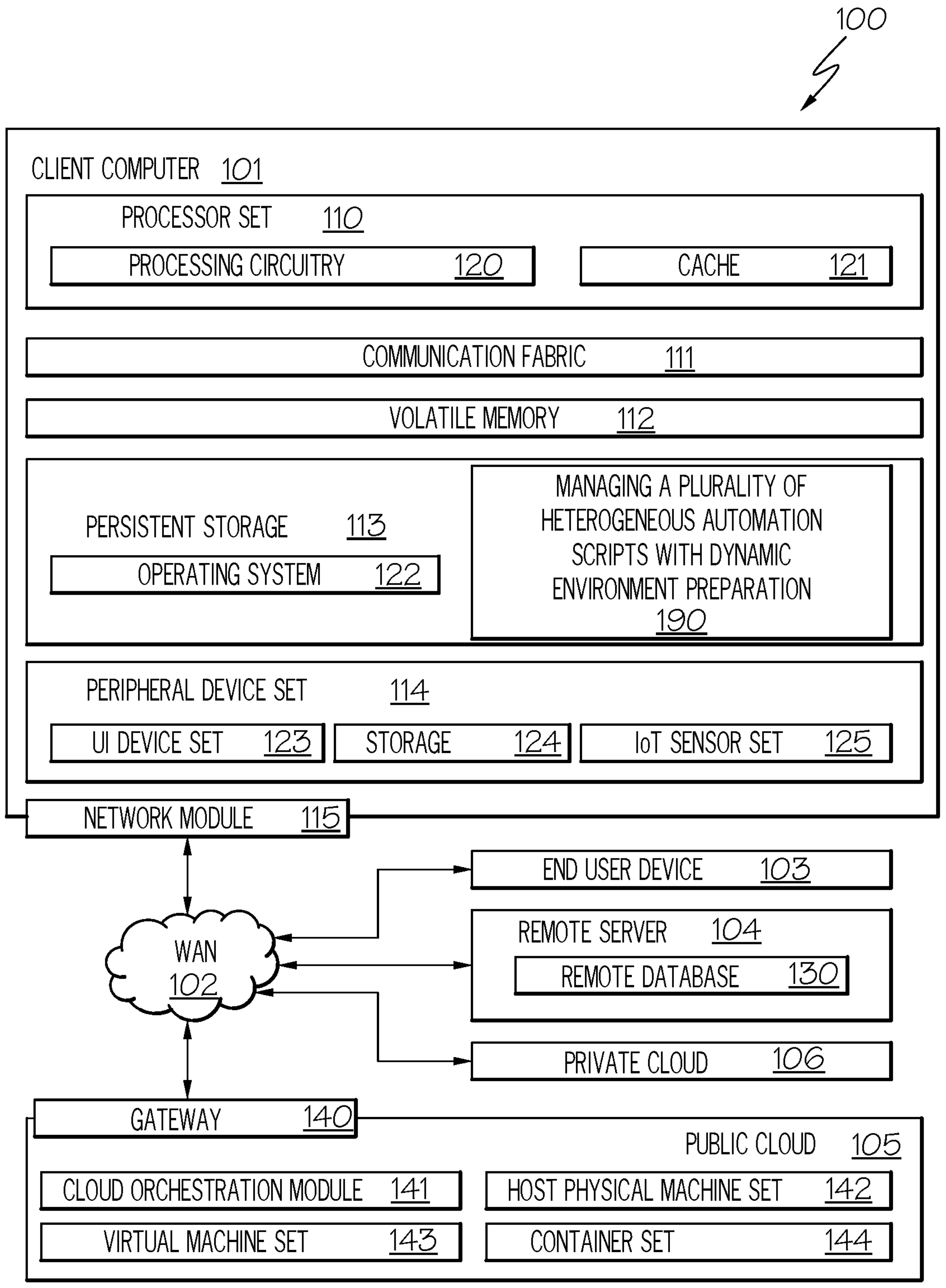
FIG. 1 depicts a block diagram illustrating an example of an environment for the execution of at least some of the computer code involved in performing the inventive methods, in accordance with embodiments of the present invention.

Computing environment 100 of FIG. 1 contains an example of an environment for the execution of at least some of the computer code involved in performing the inventive methods, such as managing a plurality of heterogeneous automation scripts with dynamic environment preparation 190. In addition to block 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 190, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 190 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Embodiments of the present invention disclose an approach for managing a plurality of heterogeneous automation scripts with dynamic environment preparation. Specifically, the approach involves allowing users to upload a script to a centralized script manager. The uploaded script is then analyzed to determine the necessary runtime environment and library resources required for successful execution. After resolving the dependencies of the script, an optimal machine on a centralized server is selected for automation. The chosen machine is equipped with the required runtime environment and library resources, which are automatically installed.

As used herein, the term "script" refers to a set of instructions or commands written in a programming or scripting language. It is typically used to automate tasks, perform specific operations, or execute a series of predefined actions. Scripts can be written in various languages such as Python, JavaScript, Shell, and PowerShell, among others. They are commonly used in software development, system administration, data processing, and other areas where repetitive or complex tasks need to be automated. Scripts can be executed by an interpreter or a runtime environment, which interprets and executes the instructions sequentially or as specified.

The proposed approach offers several advantages for developers and organizations seeking to automate tasks and streamline their processes. One key advantage is that it can leverage the pre-existing knowledge of developers, allowing them to code bots using the languages and frameworks they already know. This not only saves time and effort in learning new technologies but also can enable developers to work more efficiently and effectively by utilizing their existing skills.

Another advantage is the presence of a centralized control room to manage deployments. This can eliminate the need to replicate scripts across multiple machines and duplicate triggers to run these scripts. With a centralized control room, administrators can easily manage and monitor the execution of scripts, ensuring consistency and avoiding the risk of errors or discrepancies that may arise from manual replication.

Seamless deployment options across multiple environments are also a significant benefit of this approach. It can allow for deployment across different operating systems and settings without the need to replicate or recreate deployment configurations or environments. This flexibility can simplify the process of scaling and adapting automation solutions to different environments, saving time and effort for developers and administrators.

Also, the proposed approach can enable the creation of a marketplace where developers can share and sell new libraries for usage, as long as they adhere to the pre-established framework. This marketplace can foster collaboration and innovation, allowing developers to share their expertise and provide value-added libraries that can enhance the functionality and capabilities of automation scripts. Customers can also add their pre-existing scripts to the system without the struggle of migrating to different technologies or languages, accelerating return on investment (ROI). The system is designed to run these scripts seamlessly, enabling customers to build on top of their previous solutions and leverage their existing investments. This can eliminate the need for extensive rework or redevelopment, allowing organizations to quickly adopt the automation framework and start realizing the benefits.

Figure 2:
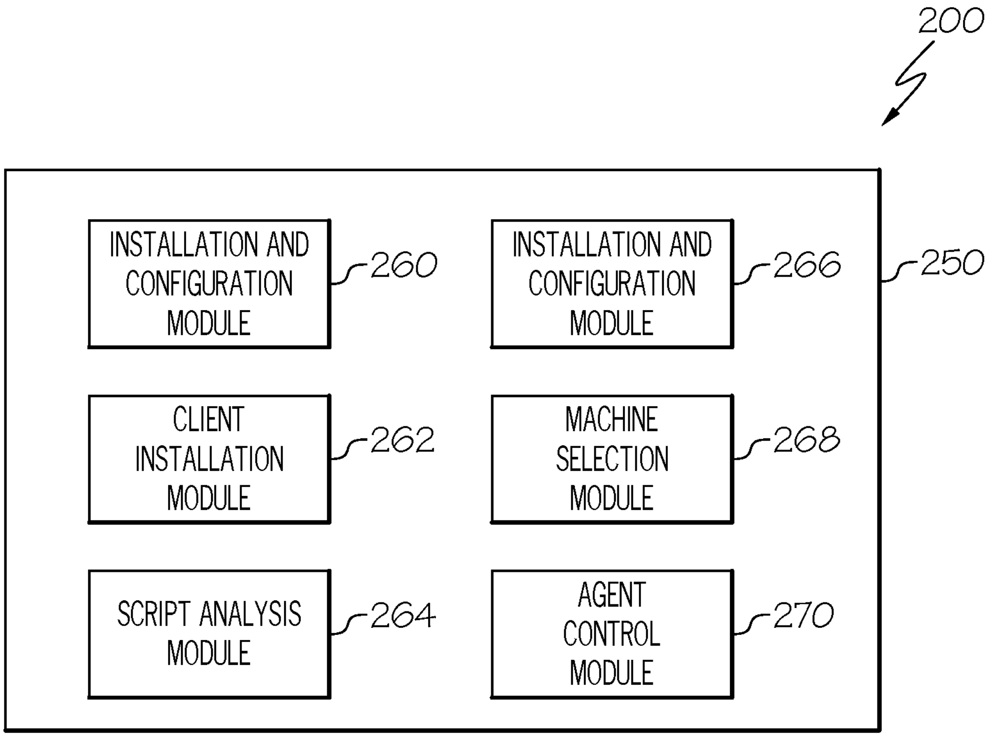
FIG. 2 depicts a block diagram of a system architecture involved in performing the inventive methods, in accordance with embodiments of the present invention.

FIG. 2 depicts a block diagram of one or more components of a system environment 200 by which services provided by a script orchestrator engine 250, in accordance with an embodiment of the present disclosure. In accordance with some embodiments, the script orchestrator engine 250 is configured to provide a centralized script automation and orchestration with dynamic environment preparation. As shown, script orchestration engine 250 includes installation and configuration module 260, client installation module 262, script analysis module 264, automation behavior module 266, machine selection module 268, and agent control module 270.

As used herein, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The functions of script orchestrator engine 250 are described below with reference to FIG. 3. Installation and configuration module 260 is configured to install and configure a centralized server on a premises. A may opt in to using script orchestrator engine 250 by actively indicating their interest or agreement. Opting in can be done through a user interface, such as a web portal or application, where the user is presented with the option to opt in. The user interface can provide clear information about the benefits, functionalities, and implications of opting in. It can outline the advantages of using script orchestrator engine 250, such as increased automation efficiency, improved script management, and reduced manual effort. The user may be required to read and accept terms and conditions, and/or associated privacy policies. Once the user has reviewed the information and agreed to participate, the user can proceed to formally opt in by following the provided instructions. This can involve clicking a button or checkbox to indicate consent or by completing a registration process. After opting in, at 302, the user can gain access to the (web) server and the features and capabilities of script orchestrator engine 250.

Once a user opts in, installation and configuration module 260 is configured to set up the necessary infrastructure. It can begin by installing the required components, including an application programming interface (API), database, web client environment, and/or repository for storing scripts. Depending on a system's architecture, these components can be installed as a complete setup or as separate services running in containers, providing flexibility and scalability. During the installation process, installation and configuration module 260 can ensure that all dependencies and prerequisites are met. To that end, it can verify that the required software versions are compatible and properly installed.

Installation and configuration module 260 is further configured to perform any necessary configurations, such as setting up network connectivity and security measures. Once the installation is complete, installation and configuration module 260 can proceed to configure the server. This can involve setting up the API endpoints, establishing database connections, and/or configuring the web client environment. It ensures that the server is properly configured to handle incoming requests, store and retrieve data from the database, and provide a user-friendly interface for managing scripts and automation. To that end, it can by set up network connectivity, verify internet access, and/or apply necessary security measures such as firewalls and secure communication protocols. Additionally, installation and configuration module 260 can provide options for customizing the server's settings based on user preferences. This could include configuring authentication and access control mechanisms, defining resource limits, and/or enabling specific features and integrations.

Client installation module 262 is configured to install a client on a user machine. To that end, client installation module 262 can offer a setup interface that presents a user with a user-friendly interface, allowing the user to select the specific runtimes required for a user application. Client installation module 262 can ensure that the client is equipped with the necessary software tools and libraries essential for the effective execution of tasks. Trigger tools can allow the client to respond to specific events or conditions, while monitoring tools can provide insights and alerts about the performance and health of applications. Orchestration tools can help the client manage and automate complex workflows and tasks. The module can determine which software tools and libraries to install based on the user's selection in the setup interface. For example, if the user selects a runtime for a Python application, the module can infer that trigger, monitoring, and orchestration tools relevant to Python development are required. To ensure uninterrupted and reliable communication between the client and the server, an agent is always running on the client machine. This agent acts as a mediator, facilitating the smooth exchange of data and instructions between the client and the server. Its primary function is to ensure that the client remains connected and responsive, allowing for real-time updates and timely task execution. As used herein, the term "runtime" refers to an execution environment where software applications or scripts are executed. It can provide the necessary resources and services for the execution of code, allowing programs to run smoothly.

Script analysis module 264 is configured to analyze a script uploaded by a user to a server, at 304 and 306. An objective is to examine the script's requirements and determine the necessary components and dependencies needed to ensure successful execution. To that end, script analysis module 264 can employ various techniques and algorithms. For example, it can begin by parsing the script to identify any specific language or framework used. This information can help the module understand the context and requirements of the script. In an embodiment, at 308 and 310, script analysis module 264 can identify any missing components and install those on the server so that the needed components are met for successful execution.

Next, script analysis module 264 can analyze the script's code structure and syntax to identify any external libraries or modules that the script relies on. It can scan through the code, looking for import statements, function calls, or any other indications of external dependencies. Once script analysis module 264 identifies the external dependencies, it can match them against a predefined database of known libraries and modules. This database can contain information about the specific versions, compatibility, and/or installation instructions for each dependency. Script analysis module 264 can then cross-references the identified dependencies with the available resources on the server. It can check if the required components are already installed and up to date. If any dependencies are missing or outdated, script analysis module 264 can flag them as requirements for successful script execution.

In an embodiment, script analysis module 264 is further configured to consider any configuration files or metadata associated with the script. Script analysis module 264 can examine these files to gather additional information about the script's requirements, such as database connections, API keys, or specific environment variables. Based on the analysis, script analysis module 264 can generate a report that outlines the necessary components and dependencies required to run the script successfully. This report can include a list of libraries, specific versions, and installation instructions. Script analysis module 264 can also provide recommendations for resolving any compatibility issues or conflicts between different dependencies. It may suggest alternative libraries or versions that are more compatible with the script's requirements.

Automation behavior module 266 is configured to allow a user to choose behaviors for automation, such as triggers and schedules. These behaviors can determine when and how the automation script should be executed. However, not all behaviors may be suitable for every machine or environment. Therefore, automation behavior module 266 can analyze the combination of these behaviors and the script prerequisites to suggest an optimal machine for running the automation. To that end, automation behavior module 266 can examine the defined triggers, which are events or conditions that initiate the execution of the automation script. Examples of triggers may include a specific time of day, a file being created or modified, or a change in a database. Automation behavior module 266 can examine the script prerequisites and dependencies identified by script analysis module 264 to ensure that the chosen triggers align with the required resources.

Next, automation behavior module 266 can evaluate the defined schedules, which determine the frequency and timing of script execution. It can consider factors such as the expected workload, the availability of the required resources, and any potential conflicts with other scheduled tasks. By analyzing the script prerequisites and dependencies, automation behavior module 266 can ensure that the chosen schedules align with the availability and capacity of the optimal machine. Automation behavior module 266 can then combine the chosen triggers and schedules to create a comprehensive automation behavior plan. It can assess the resource requirements of the script, including CPU, memory, storage, and network connectivity. It can also consider any specific software tools or libraries that the script relies on.

Based on this analysis of a selected script, at 314, automation behavior module 266 can suggest an optimal machine that can fulfill the requirements of the chosen automation behaviors and script prerequisites. In other words, it can create a deployment, at 312. To that end, it can consider the available machines in the environment, their specifications, and their current workload. Creating a deployment refers to the process of setting up and managing a software application or service on a server or cloud infrastructure. It involves configuring and organizing all the necessary resources, such as servers, databases, and networking components, to ensure that the application is running smoothly and accessible to users.

Automation behavior module 266 may also consider factors such as the machine's processing power, memory capacity, and network connectivity to ensure efficient and reliable script execution. Additionally, automation behavior module 266 can provide recommendations or warnings if the chosen automation behaviors and script prerequisites are not compatible with the available machines. It can suggest alternative behaviors or recommend upgrading the machine's resources to ensure optimal performance. By analyzing the combination of automation behaviors, script prerequisites, and available resources, automation behavior module 266 can assist users in making informed decisions about the optimal machine for running their automation. This ensures that the chosen behaviors align with the capabilities and capacity of the machine, resulting in efficient and reliable script execution.

Machine selection module 268 is configured to present a suggestion for the optimal machine to a user. Once the suggestion is presented, the user has the option to either accept the suggested machine or choose another one. If the user agrees with the suggestion, machine selection module 268 can proceed with validating whether the chosen machine meets the prerequisites of the automation script. It can compare the specifications and capabilities of the selected machine with the requirements identified in the script prerequisites and dependencies. These prerequisites may include factors such as the operating system version, available software tools, required storage capacity, or network connectivity. If the chosen machine meets all the prerequisites, machine selection module 268 can proceed with the execution of the automation script on the selected machine. For example, if a C#script requires a .NET runtime, machine selection module 268 can identify machines that already have it installed and offer the option to deploy the script to those machines, minimizing idle time and reducing dependency duplication.

However, if the chosen machine does not meet the prerequisites, machine selection module 268 can prompt the user to take appropriate action. It can suggest preparing the environment by installing required software, updating the operating system, or allocating additional resources to the machine. Machine selection module 268 can provide guidance on how to meet the prerequisites to ensure successful script execution. Alternatively, if the user decides to choose another machine, machine selection module 268 can allow the user to browse through the available machines in the environment, at 316. It can provide information about each machine's specifications, current workload, and availability. The user can make an informed decision based on this information and select a machine that aligns with the prerequisites of the automation script. Once a new machine is chosen, machine selection module 268 can repeat the validation process to ensure that the selected machine meets all the prerequisites, at 318. If it does, at 322, machine selection module 268 can proceed with the execution of the automation script on the newly selected machine. If not, at 320, it can prompt the user to prepare the environment or select another machine until a suitable machine is found.

Agent control module 270 is configured to control all communication between runtimes and a server. Acting as a mediator, agent control module 270 can provide the necessary tools and functionalities for runtimes to access data, parameters, and credentials securely. Agent control module 270 can enable runtimes to securely access data and parameters required for the automation scripts. It can ensure that the runtimes have the appropriate permissions and authentication to access sensitive information. To that end, agent control module 270 can establish a secure connection between the runtimes and the server, implementing encryption protocols and authentication mechanisms to protect the data during transmission.

In an embodiment, once the computer is selected, agent control module 270 can present the user with an option to choose an execution method, at 324. This step allows the user to decide how the user wants the selected computer to run the desired script. The execution method can vary depending on the user's preferences and the specific requirements of the script. After selecting the execution method, the next step can involve installing any necessary client-side components on the chosen computer, at 326. These components can be essential for the proper functioning of the script and enable the user to interact with and utilize its features. The installation process can typically involve downloading the necessary files and configuring them to work seamlessly with the computer's operating system. Once the client-side components are successfully installed, the chosen computer is now ready to run the script.

Additionally, agent control module 270 can manage the storage and retrieval of credentials. It can secure store and manage credentials such as usernames, passwords, and API keys, ensuring that they are accessible to the runtimes when needed. By centralizing the storage of credentials, the module enhances security and simplifies the authentication process for the runtimes. Also, agent control module 270 can handle different triggers for the automation scripts, such as new emails, incoming HTTP requests, or file state changes. It can monitor these triggers, continuously checking for any events that should initiate the execution of the scripts, at 328. Once a trigger event occurs, at 330, agent control module 270 can notify the appropriate runtime, ensuring that the components are set to run the script and that the script is executed promptly in response to the trigger, at 332 and 334. The system the returns to the waiting state, at 336, ready to respond to future triggers.

The disclosed approach can provide a framework that enables users to create new libraries. Users can download a blueprint from the framework, which the user can extend to develop their own libraries. For example, if a user creates an image processing code that extracts information from a driver's license using a photo, the user can utilize the framework blueprint to build a library with this code. This eliminates the need to replicate the code in every script, ensuring efficient and streamlined development processes. Once created, the library can be consumed by clients as an API, making it possible to use it in different programming languages.

Also, a server can be configured to monitor all activity of the scripts. This monitoring functionality involves keeping track of various parameters such as execution time, errors, and output. The collected data can then be stored in a centralized database, allowing for easy access and analysis.

Users can leverage this data to identify and address issues, optimize script performance, and gain valuable insights. Additionally, the server can generate reports and notifications based on the logged data, providing users with real-time updates on script status and progress. This centralized monitoring and logging system enhances the overall efficiency, reliability, and continuous improvement of the system.

Figure 4:
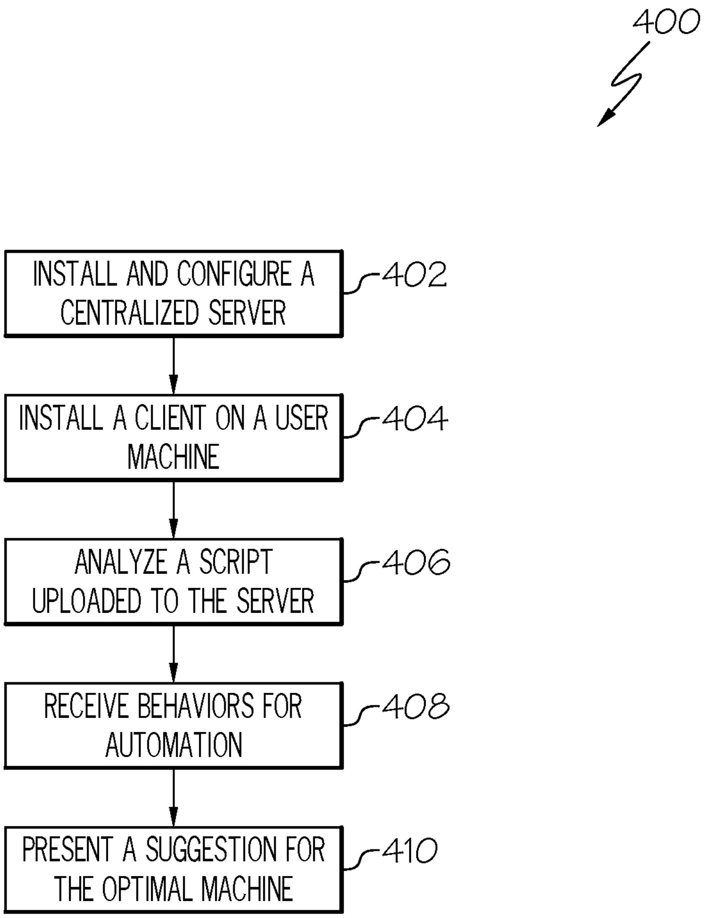
FIG. 4 depicts a high-level flow diagram for managing a plurality of heterogeneous automation scripts with dynamic environment preparation, in accordance with embodiments of the present invention.

FIG. 4 depicts a flowchart diagram 400 related to managing a plurality of heterogeneous automation scripts with dynamic environment preparation. At 402, installation and configuration module 260 installs and configures a centralized server on a premises. This step sets up the infrastructure for an automation system. At 404, client installation module 262 installs a client on a user machine. This step allows users to interact with the automation system from their own machines. Script analysis module 264 analyzes a script uploaded by a user to a server, at 406. This step examines the script provided by the user, which will be used for automation. At 408, automation behavior module 266 allows the user to choose behaviors for automation. This step enables users to customize the actions and behaviors of the automation system according to the user's requirements. Machine selection module 268 presents a suggestion for the optimal machine to the user, at 410. This step recommends the most suitable machine for running the automation scripts, considering factors like performance and availability.

Figure 3:
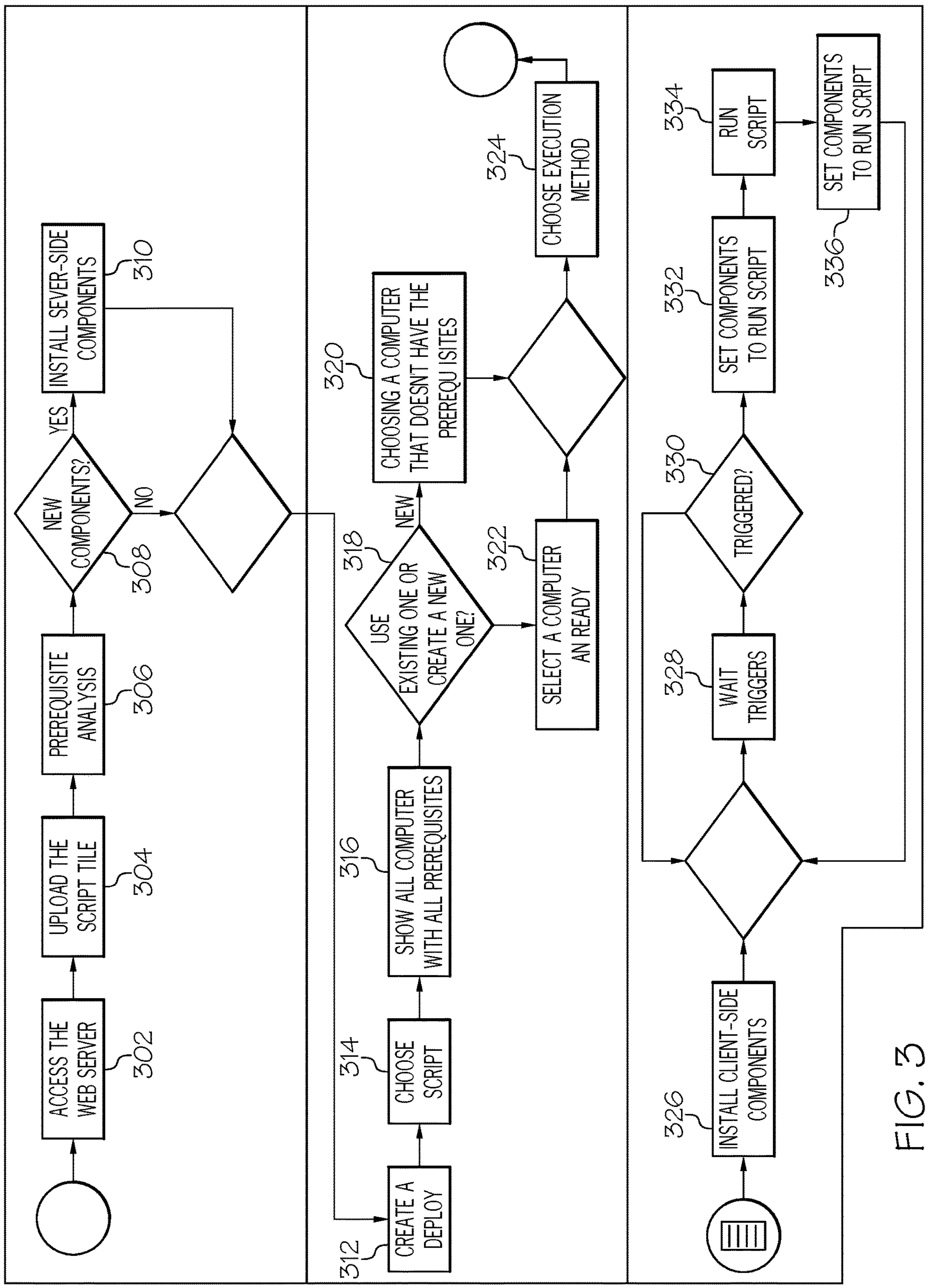
FIG. 3 depicts a flow diagram for managing a plurality of heterogeneous automation scripts with dynamic environment preparation, in accordance with embodiments of the present invention.

The illustrated steps in FIGS. 3-4 are not necessarily performed in the order shown, and some steps may be performed concurrently or in a different order than shown. The flowchart diagrams are intended to illustrate the general flow of the method and is not intended to be limiting. Additional steps may be added, or some steps may be omitted without departing from the scope of the invention. The steps may be performed by a computer program or by a combination of hardware and software. The flowchart diagram may be implemented using any suitable programming language or tool.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing heterogeneous automation scripts, comprising:

analyzing, by a script orchestrator engine, a script uploaded to a centralized script manager by a user to identify a runtime environment for the script and a set of library resources required for successful script execution, wherein analyzing comprises parsing the script to extract file extension of the script and library imports to determine the runtime environment and the set of library resources;

resolving, by the script orchestrator engine, a set of dependencies for the script based on the analysis;

evaluating, by the script orchestrator engine, defined schedules associated with automation of the script to determine frequency and timing of the script execution based on the set of library resources and the set of dependencies;

selecting, by the script orchestrator engine, one or more schedules from the defined schedules;

selecting, by the script orchestrator engine, an optimal machine on a centralized server for the automation of the script based on the selected one or more schedules, the runtime environment, and the set of dependencies, wherein selecting the optimal machine comprises evaluating available machines based on specifications and current workload;

synchronizing the selected one or more schedules with availability and capacity of the optimal machine, wherein synchronizing comprises monitoring availability and capacity of computing resources of the optimal machine and aligning execution timing of the script based on the monitored availability and capacity and conflicts with other scheduled tasks; and creating a deployment on the optimal machine by configuring the computing resources for execution of the script, and automatically installing the runtime environment and the set of library resources for the automation of the script on the optimal machine based on the synchronization.

2. The computer-implemented method of claim 1, further comprising:

presenting a suggestion for the optimal machine; and receiving, by the script orchestrator engine, a response to accept the suggestion.

3. The computer-implemented method of claim 2, further comprising establishing, by the script orchestrator engine, a process to execute the script on the optimal machine based on the response.

4. The computer-implemented method of claim 1, further comprising employing, by the script orchestrator engine, an application programming interface to manage a set of agents that execute a plurality of automation scripts on a client machine.

5. The computer-implemented method of claim 4, further comprising executing, by an agent among the set of agents, the script based on a predefined condition.

6. The computer-implemented method of claim 1, further comprising providing, by the script orchestrator engine, a downloadable framework that enables the user to create a new library.

7. The computer-implemented method of claim 1, wherein the analysis of the script is performed by the script orchestrator engine based on a file extension of the script and library imports to automatically resolve the set of dependencies for the script.

8. A computing system for managing heterogeneous automation scripts, comprising:

a processor;

a memory device coupled to the processor; and a computer readable storage device coupled to the processor, wherein the computer readable storage device contains program code executable by the processor via the memory device to implement a method, the method comprising:

analyzing, by a script orchestrator engine, a script uploaded to a centralized script manager by a user to identify a runtime environment for the script and a set of library resources required for successful script execution, wherein analyzing comprises parsing the script to extract file extension of the script and library imports to determine the runtime environment and the set of library resources;

resolving, by the script orchestrator engine, a set of dependencies for the script based on the analysis;

evaluating, by the script orchestrator engine, defined schedules associated with automation of the script to determine frequency and timing of the script execution based on the set of library resources and the set of dependencies;

selecting, by the script orchestrator engine, one or more schedules from the defined schedules;

selecting, by the script orchestrator engine, an optimal machine on a centralized server for the automation of the script based on the selected one or more schedules, the runtime environment, and the set of dependencies, wherein selecting the optimal machine comprises evaluating available machines based on specifications and current workload;

synchronizing the selected one or more schedules with availability and capacity of the optimal machine, wherein synchronizing comprises monitoring availability and capacity of computing resources of the optimal machine and aligning execution timing of the script based on the monitored availability and capacity and conflicts with other scheduled tasks; and creating a deployment on the optimal machine by configuring the computing resources for execution of the script, and automatically installing the runtime environment and the set of library resources for the automation of the script on the optimal machine based on the synchronization.

9. The computing system of claim 8, the method further comprising:

presenting a suggestion for the optimal machine; and receiving, by the script orchestrator engine, a response to accept the suggestion.

10. The computing system of claim 9, the method further comprising establishing, by the script orchestrator engine, initiation of a process to execute the script on the optimal machine based on the response.

11. The computing system of claim 10, the method further comprising employing, by the script orchestrator engine, an application programming interface to manage a set of agents that execute a plurality of automation scripts on a client machine.

12. The computing system of claim 11, the method further comprising executing, by an agent among the set of agents, the script based on a predefined condition.

13. The computing system of claim 8, the method further comprising providing, by the script orchestrator engine, a downloadable framework that enables the user to create a new library.

14. The computing system of claim 8, wherein the analysis of the script is performed by the script orchestrator engine based on file extension of the script and library imports to automatically resolve the set of dependencies for the script.

15. A computer program product for managing heterogeneous automation scripts, the computer program product comprising a computer readable storage device, and program instructions stored on the computer readable storage device, to cause a processor to perform operations comprising:

analyzing, by a script orchestrator engine, a script uploaded to a centralized script manager by a user to identify a runtime environment for the script and a set of library resources required for successful script execution, wherein analyzing comprises parsing the script to extract file extension of the script and library imports to determine the runtime environment and the set of library resources;

resolving, by the script orchestrator engine, a set of dependencies for the script based on the analysis;

evaluating, by the script orchestrator engine, defined schedules associated with automation of the script to determine frequency and timing of the script execution based on the set of library resources and the set of dependencies;

selecting, by the script orchestrator engine, one or more schedules from the defined schedules;

selecting, by the script orchestrator engine, an optimal machine on a centralized server for the automation of the script based on the selected one or more schedules, the runtime environment, and the set of dependencies, wherein selecting the optimal machine comprises evaluating available machines based on specifications and current workload;

synchronizing the selected one or more schedules with availability and capacity of the optimal machine, wherein synchronizing comprises monitoring availability and capacity of computing resources of the optimal machine and aligning execution timing of the script based on the monitored availability and capacity and conflicts with other scheduled tasks; and creating a deployment on the optimal machine by configuring computing resources including servers and networking components for execution of the script, and automatically installing the runtime environment and the set of library resources for the automation of the script on the optimal machine based on the synchronization.

16. The computer program product of claim 15, wherein the operations further comprise:

presenting a suggestion for the optimal machine; and receiving, by the script orchestrator engine, a response to accept the suggestion.

17. The computer program product of claim 16, wherein the operations further comprise establishing, by the script orchestrator engine, initiation of a process to execute the script on the optimal machine based on the response.

18. The computer program product of claim 15, wherein the operations further comprise employing, by the script orchestrator engine, an application programming interface to manage a set of agents that execute a plurality of automation scripts on a client machine.

19. The computer program product of claim 15, wherein the operations further comprise rendering, by the script orchestrator engine, a downloadable framework that enables the user to create a new library.

20. The computer program product of claim 15, wherein the analysis of the script is performed by the script orchestrator engine based on file extension of the script and library imports to automatically resolve the set of dependencies for the script.

* * * * *